US012698783B2

(12) United States Patent　　　　　(10) Patent No.:　US 12,698,783 B2

Kilchyk et al.　　　　　　　　　　　(45) Date of Patent:　　　Aug. 4, 2026

(54) AIRCRAFT COMPONENT ADDITIVELY HAVING THERMALLY ADAPTIVE MATERIAL AND A THERMOELECTRIC JUNCTION

(71) Applicant: Hamilton Sundstrand Corporation, Charlotte, NC (US)

(72) Inventors: Viktor Kilchyk, Lancaster, NY (US); Brent J. Merritt, Southwick, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 307 days.

(21) Appl. No.: 18/464,139

(22) Filed: Sep. 8, 2023

(65) Prior Publication Data

US 2025/0084833 A1　　Mar. 13, 2025

(51) Int. Cl.
　*F03G 7/06*　　　　(2006.01)
　*B64D 13/00*　　　　(2006.01)
　*F04D 27/02*　　　　(2006.01)

(52) U.S. Cl.
　CPC ...... *F04D 27/0215* (2013.01); *F03G 7/06114* (2021.08); *B64D 13/00* (2013.01)

(58) Field of Classification Search
　CPC ..... F03G 7/0614; F03G 7/06114; B64C 9/24; B64C 13/40; F04D 27/0215; B64D 13/00
　See application file for complete search history.

(56) References Cited

U.S. PATENT DOCUMENTS

| | | |
|---|---|---|
| 3,326,726 A | 6/1967 | Bassett, Jr. et al. |
| 3,513,881 A | 5/1970 | Kinsell |
| 3,687,365 A | 8/1972 | Laessig |
| 4,327,154 A | 4/1982 | Rossmann |
| 4,418,549 A | 12/1983 | Courneya |
| 4,441,653 A | 4/1984 | Grudich |
| 4,454,983 A | 6/1984 | Tarvis, Jr. |
| 4,851,285 A | 7/1989 | Brotz |
| 4,939,038 A | 7/1990 | Inabata |
| 5,230,850 A | 7/1993 | Lewis |
| 5,634,189 A | 5/1997 | Rossmann et al. |
| 5,720,339 A | 2/1998 | Glass et al. |
| 5,769,389 A | 6/1998 | Jacobsen et al. |
| 6,100,463 A | 8/2000 | Ladd et al. |

(Continued)

FOREIGN PATENT DOCUMENTS

| | | | | |
|---|---|---|---|---|
| CN | 114423927 A | * | 4/2022 | ............ F01D 11/122 |
| DE | 10250758 A1 | | 5/2004 | |

(Continued)

OTHER PUBLICATIONS

English machine translation of CN-114423927-A (Year: 2022).*

(Continued)

*Primary Examiner* — Nathan C Zollinger

(74) *Attorney, Agent, or Firm* — CANTOR COLBURN LLP

(57) ABSTRACT

A device, having: a base having an outer boundary and a plurality of base voids, formed from a first material having a first coefficient of thermal expansion (CTE); beads that line ones of the base voids, formed from a second material having a second CTE that differs from the first CTE, wherein each of the beads has a bead void; and a thermoelectric junction around the outer boundary, or within one or more of the bead voids.

5 Claims, 4 Drawing Sheets

(56) References Cited

U.S. PATENT DOCUMENTS

| | | | |
|---|---|---|---|
| 6,161,382 | A | 12/2000 | Brotz |
| 6,182,929 | B1 | 2/2001 | Martin et al. |
| 6,371,437 | B1 | 4/2002 | Kenny et al. |
| 7,037,076 | B2 | 5/2006 | Jacot et al. |
| 7,147,269 | B2 | 12/2006 | Aase et al. |
| 7,650,910 | B2 | 1/2010 | Welle |
| 7,686,040 | B2 | 3/2010 | Welle |
| 7,721,762 | B2 | 5/2010 | Welle |
| 7,753,654 | B2 | 7/2010 | Read et al. |
| 7,770,959 | B2 | 8/2010 | Browne et al. |
| 7,854,467 | B2 | 12/2010 | McKnight et al. |
| 7,922,456 | B2 | 4/2011 | McMillan |
| 7,967,568 | B2 | 6/2011 | Dalton et al. |
| 8,119,206 | B2 | 2/2012 | Hougham et al. |
| 8,205,668 | B2 | 6/2012 | Freese, V |
| 9,181,933 | B2 | 11/2015 | Daly et al. |
| 9,719,536 | B2 | 8/2017 | Ashmawi et al. |
| 9,752,442 | B2 | 9/2017 | Hayford et al. |
| 9,784,126 | B2 | 10/2017 | Army et al. |
| 9,897,078 | B2 | 2/2018 | Nicholson et al. |
| 9,919,470 | B2 | 3/2018 | Behl et al. |
| 9,981,421 | B2 | 5/2018 | Marcoe et al. |
| 10,053,239 | B2 | 8/2018 | Mabe et al. |
| 10,543,897 | B2 | 1/2020 | Brown et al. |
| 10,731,666 | B2 * | 8/2020 | Skertic .................... F04D 17/10 |
| 10,815,976 | B2 | 10/2020 | Kaneko et al. |
| 10,976,119 | B2 | 4/2021 | Veto et al. |
| 10,982,783 | B2 | 4/2021 | Srinivasa Murthy |
| 11,008,943 | B2 | 5/2021 | Tajiri et al. |
| 11,110,647 | B2 | 9/2021 | Marcoe et al. |
| 11,167,836 | B2 | 11/2021 | Hethcock, Jr. |
| 11,192,333 | B2 | 12/2021 | Hahnlen |
| 11,248,592 | B1 | 2/2022 | Tsuruta et al. |
| 11,268,520 | B2 | 3/2022 | Melo et al. |
| 11,359,287 | B2 | 6/2022 | Philibert |
| 11,655,346 | B2 | 5/2023 | Jackson et al. |
| 11,668,316 | B1 | 6/2023 | Kilchyk et al. |
| 12,162,606 | B1 | 12/2024 | Merritt et al. |
| 12,384,515 | B2 | 8/2025 | Kilchyk et al. |
| 2001/0008357 | A1 | 7/2001 | Dhuler et al. |
| 2003/0025093 | A1 | 2/2003 | Kenny et al. |
| 2005/0005983 | A1 | 1/2005 | Lewis |
| 2007/0140862 | A1 | 6/2007 | McMillan |
| 2007/0171257 | A1 | 7/2007 | Yang |
| 2007/0184238 | A1 | 8/2007 | Hockaday et al. |
| 2008/0196430 | A1 | 8/2008 | McGill et al. |
| 2008/0236668 | A1 | 10/2008 | Beerling et al. |
| 2008/0302024 | A1 | 12/2008 | Browne et al. |
| 2010/0028205 | A1 | 2/2010 | Ponjee et al. |
| 2010/0304063 | A1 | 12/2010 | Mccrea et al. |
| 2011/0284645 | A1 | 11/2011 | Tiliakos et al. |
| 2012/0255278 | A1 | 10/2012 | Miao et al. |
| 2013/0048135 | A1 | 2/2013 | Blumenthal et al. |
| 2013/0255796 | A1 | 10/2013 | Dimascio et al. |
| 2013/0255815 | A1 | 10/2013 | Brinkmann et al. |
| 2013/0287555 | A1 | 10/2013 | Rosen et al. |
| 2014/0186161 | A1 | 7/2014 | Colson et al. |
| 2015/0033730 | A1 | 2/2015 | Beers et al. |
| 2015/0239046 | A1 | 8/2015 | Mcmahan et al. |
| 2016/0025078 | A1 | 1/2016 | Li et al. |
| 2016/0160353 | A1 | 6/2016 | Miarecki et al. |
| 2016/0160869 | A1 | 6/2016 | Roach et al. |
| 2016/0186575 | A1 | 6/2016 | Lacy et al. |
| 2017/0001263 | A1 | 1/2017 | Steiner |
| 2017/0227019 | A1 | 8/2017 | Chen et al. |
| 2018/0038513 | A1 | 2/2018 | Baldea et al. |
| 2018/0043660 | A1 | 2/2018 | Kang et al. |
| 2018/0058429 | A1 | 3/2018 | Kwon et al. |
| 2019/0203039 | A1 | 7/2019 | Seo et al. |
| 2019/0210111 | A1 | 7/2019 | Army et al. |
| 2020/0009826 | A1 | 1/2020 | Brown et al. |
| 2020/0316684 | A1 | 10/2020 | Shuck |
| 2021/0020263 | A1 | 1/2021 | Pasini et al. |
| 2021/0071020 | A1 | 3/2021 | Hu |
| 2021/0085856 | A1 | 3/2021 | Ding |
| 2021/0229350 | A1 | 7/2021 | Chaffins et al. |
| 2021/0238748 | A1 | 8/2021 | Andreatta |
| 2021/0277937 | A1 | 9/2021 | Elbibary et al. |
| 2021/0372286 | A1 | 12/2021 | Chakrabarti et al. |
| 2022/0034592 | A1 | 2/2022 | Maynard et al. |
| 2022/0089799 | A1 | 3/2022 | Wang et al. |
| 2023/0080512 | A1 | 3/2023 | Merritt et al. |
| 2023/0085189 | A1 | 3/2023 | Merritt et al. |
| 2023/0142146 | A1 | 5/2023 | Kilchyk |
| 2023/0227680 | A1 | 7/2023 | Hu |
| 2023/0304506 | A1 | 9/2023 | Kilchyk et al. |
| 2025/0033270 | A1 | 1/2025 | Merritt et al. |
| 2025/0033271 | A1 | 1/2025 | Merritt et al. |
| 2025/0033272 | A1 | 1/2025 | Merritt et al. |
| 2025/0033282 | A1 | 1/2025 | Merritt et al. |
| 2025/0033283 | A1 | 1/2025 | Merritt et al. |
| 2025/0033796 | A1 | 1/2025 | Merritt et al. |
| 2025/0083795 | A1 | 3/2025 | Kilchyk et al. |
| 2025/0084766 | A1 | 3/2025 | Kilchyk et al. |
| 2025/0084833 | A1 | 3/2025 | Kilchyk et al. |
| 2025/0084834 | A1 | 3/2025 | Kilchyk et al. |
| 2025/0084859 | A1 | 3/2025 | Kilchyk et al. |
| 2025/0085725 | A1 | 3/2025 | Kilchyk et al. |
| 2025/0088125 | A1 | 3/2025 | Kilchyk et al. |
| 2025/0089567 | A1 | 3/2025 | Kilchyk et al. |
| 2025/0089568 | A1 | 3/2025 | Kilchyk et al. |

FOREIGN PATENT DOCUMENTS

| | | | |
|---|---|---|---|
| DE | 102014225229 | A1 | 6/2016 |
| EP | 2025777 | A2 | 2/2009 |
| EP | 2974954 | A1 | 1/2016 |
| EP | 2960497 | B1 | 12/2016 |
| EP | 4177440 | A1 | 5/2023 |
| EP | 4209681 | A1 | 7/2023 |
| EP | 4219959 | A2 | 8/2023 |
| EP | 4411108 | A2 | 8/2024 |
| GB | 2472053 | A | 1/2011 |
| JP | 2007023361 | A | 2/2007 |
| JP | 2011148037 | A | 8/2011 |
| JP | 2022121766 | A * | 8/2022 |
| KR | 20130005989 | A | 1/2013 |
| WO | 2015006438 | A1 | 1/2015 |
| WO | 2018108908 | A1 | 6/2018 |
| WO | 2019108203 | A1 | 6/2019 |
| WO | 2019162754 | A1 | 8/2019 |

OTHER PUBLICATIONS

English machine translation of JP-2022121766-A (Year: 2022).*
Hao et al., "A Review of Smart Materials for the Boost of Soft Actuators, Soft Sensors, and Robotics Applications", Chinese Journal of Mechanical Engineering, 2022, pp. 1-16.
European Search Report for Application No. 24196227.3, mailed Oct. 31, 2024, 10 pages.
European Search Report for Application No. 24196233.1, mailed Oct. 31, 2024, 10 pages.
European Search Report for Application No. 24198989.6, mailed Nov. 4, 2024, 11 pages.
MARKFORGED "Onyx FR-A and Carbon Fiber FR-A: Aerospace-Ready Materials", markforged.com, Jul. 26, 2021, pp. 1-6.
Noughabi et al., "Detailed Design and Aerodynamic Performance Analysis of a Radial-Inflow Turbine", Applied Sciences, 2018, pp. 1-21.
Pearson et al., "Novel polyurethane elastomeric composites reinforced with alumina, aramid, and poly (p-phenylene-2, 6-benzobisoxazole) short fibers, development and characterization of the thermal and dynamic mechanical properties", Composites Part B: Engineering 122 (2017): 192-201.
Zhan et al., "Metal-plastic hybrid 3D printing using catalyst-loaded filament and electroless plating", Additive Manufacturing, 2020, pp. 1-7.
Zhiguo et al., "Determination of thermal expansion coefficients for unidirectional fiber-reinforced composites", Chinese Journal of Aeronautics, 2014, pp. 1-14.

(56) References Cited

OTHER PUBLICATIONS

Extended European Search Report for EP Application No. 24182403.
6, dated Jun. 2, 2025, pp. 1-11.
Extended European Search Report for EP Application No. 24196240.
6, dated Apr. 28, 2025, pp. 1-13.
Giani et al., "Towards sustainability in 3D printing of thermoplastic
composites: Evaluation of recycled carbon fibers as reinforcing
agent for FDM filament production and 3D printing", Composites:
Part A 159, 2002, pp. 1-12.
Lazarus et al., "Direct electroless plating of conductive thermoplas-
tics for selective metallization of 3D printed parts", Additive
Manufacturing, vol. 55, Mar. 30, 2022, pp. 1-11.
Tammaro et al., "Reinforcing Efficiency of Recycled Carbon Fiber
PLA Filament Suitable for Additive Manufacturing", Polymers
2024, pp. 1-17.
Doering et al., "Micromachined thermoelectrically driven cantilever
structures for fluid jet deflection" [1992] Proceedings IEEE Micro
Electro Mechanical Systems. IEEE, (Feb. 1992) pp. 12-18.
European Search Report for Application No. 24190738.5, mailed
Jan. 13, 2025, 8 pages.
European Search Report for Application No. 24196219.0, mailed
Jan. 13, 2025, 8 pages.
European Search Report for Application No. 24196295.0, mailed
Jan. 29, 2025, 16 pages.
European Search Report for Application No. 24196309.9, mailed
Jan. 28, 2025, 10 pages.
European Search Report for Application No. 24199023.3, mailed
Feb. 21, 2025, 15 pages.
European Search Report for Application No. 24199038.1, mailed
Jan. 31, 2025, 8 pages.
European Search Report for Application No. 24199041.5, mailed
Jan. 28, 2025, 8 pages.

Jerman "Electrically-activated, micromachined diaphragm valves"
IEEE 4th Technical Digest on Solid-State Sensor and Actuator
Workshop, Hilton Head, SC, USA, (Jun. 1990) pp. 65-69.
Jerman et al., "Electrically activated normally closed diaphragm
valves" Journal of Micromechanics and Microengineering 4.4 (Dec.
1994) pp. 210-216.
Partial European Search Report for Application No. 24196240.6,
mailed Feb. 7, 2025, 16 pages.
Richardson,, "The aerospace secret standard", Apr. 12, 2019, Aero-
space Manufacturing, www.aero-mag.com/the- aerospace-secret-
standard; 8 pages.
Kim, Daejong, "Parametric Studies on Static and Dynamic Perfor-
mance of Air Foil Bearings with Different Top Foil Geometries and
Bump Stiffness Distributions", https://doi.org/10.1115/1.2540065;
Published Online: Nov. 15, 2006, 9 pages.
Lim, Teik-Cheng "Metamaterial with sign-toggling thermal expansiv-
ity inspired by Islamic motifs in Spain", Journal of Science:
Advanced Materials and Devices, vol. 7, No. 1, Mar. 2022, 6 pages.
Micalizz, et al., "Shape-memory actuators manufacturing by dual
extrusion multimaterial 3d printing of conductive and non-
conductive filaments", Smart Mater. Struct. 28, 2019, pp. 1-13.
Schmiedeke, et al. "Experimental Investigation of Two Switching
States of an Active Foil Bearing during Start-Up", Machines 2022,
Published Jun. 6, 2022, 18 pages.
Wei, et al., "An overview of laser-based multiple metallic material
additive manufacturing: from macro-to micro-scales", International
Journal of Extrem. Manuf. 3 (2021), pp. 1-33.
European Search Report for Application No. 24188681.1, mailed
Dec. 4, 2024, 10 pages.
European Search Report for Application No. 24188696.9, mailed
Dec. 16, 2024, 8 pages.
European Search Report for Application No. 24188713.2, mailed
Jan. 2, 2025, 6 pages.
European Search Report for Application No. 24188714.0, mailed
Dec. 13, 2024, 10 pages.

* cited by examiner

L2

70

W2

T2 > T1

L1

30 80

90

105 150

100

70

95

150

W1

T1

156

154

190

152

P N P N P N P

AIRCRAFT COMPONENT ADDITIVELY HAVING THERMALLY ADAPTIVE MATERIAL AND A THERMOELECTRIC JUNCTION

BACKGROUND

The embodiments are directed to an aircraft component and more specifically to an aircraft component having a thermally adaptive material and a thermoelectric junction.

Memory shape alloys may be utilized for various turbomachinery applications to avoid the requirement of utilizing complex machinery. However, working fluid temperatures may undesirably control the shape of the alloy.

BRIEF DESCRIPTION

Disclosed is a device, including: a base having an outer boundary and a plurality of base voids, formed from a first material having a first coefficient of thermal expansion (CTE); beads that line ones of the base voids, formed from a second material having a second CTE that differs from the first CTE, wherein each of the beads has a bead void; and a thermoelectric junction around the outer boundary, or within one or more of the bead voids.

In addition to one or more aspects of the device, or as an alternate, the thermoelectric junction is a Peltier device.

In addition to one or more aspects of the device, or as an alternate, one or more of the first material and the second material is a bistable metal, alloy or composite.

In addition to one or more aspects of the device, or as an alternate, a base outer surface is formed from the second material.

In addition to one or more aspects of the device, or as an alternate, the device is a compressor case of a cabin air compressor.

In addition to one or more aspects of the device, or as an alternate, a section of the device defines a bypass port that is opened or closed by driving current, through the thermoelectric junction, in a first direction or a second direction.

A cabin air compressor including a device having one or more of the above aspects.

Disclosed is another device, including a base, formed from a first material having a first CTE, that extends in a first direction from first side to a second side and in a second direction from a first end to a second end; and a thermoelectric junction disposed between the first and second sides, so that the thermoelectric junction extends between the first and second ends, to thereby define: a first layer of the base that is between the thermoelectric junction and the first side of the base; and a second layer of the base that is between the thermoelectric junction and the second side of the base.

In addition to one or more aspects of the another device, or as an alternate, the thermoelectric junction is a Peltier device.

In addition to one or more aspects of the another device, or as an alternate, the first material is a bistable metal, alloy, or composite.

In addition to one or more aspects of the another device, or as an alternate, the device is configured so that driving a current through the thermoelectric junction heats the first layer of the base relative to the second layer of the base to change a shape of the base.

In addition to one or more aspects of the another device, or as an alternate, the device is a compressor case of a cabin air compressor.

A cabin air compressor including a compressor case having one or more of the above disclosed aspects.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus are presented herein by way of exemplification and not limitation with reference to the Figures.

Figure 1A:
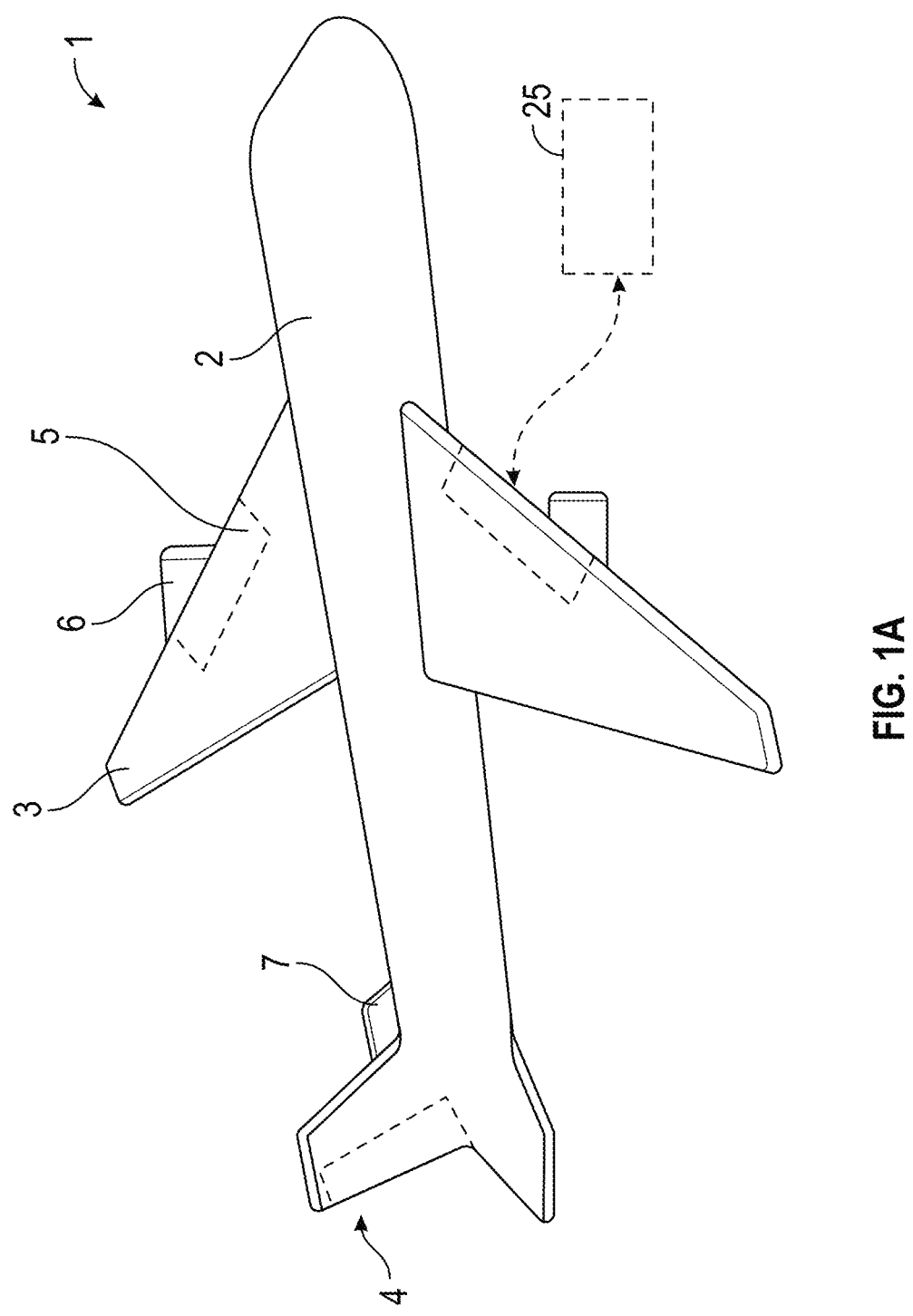
FIG. 1A shows an aircraft according to an embodiment.
Figure 1B:
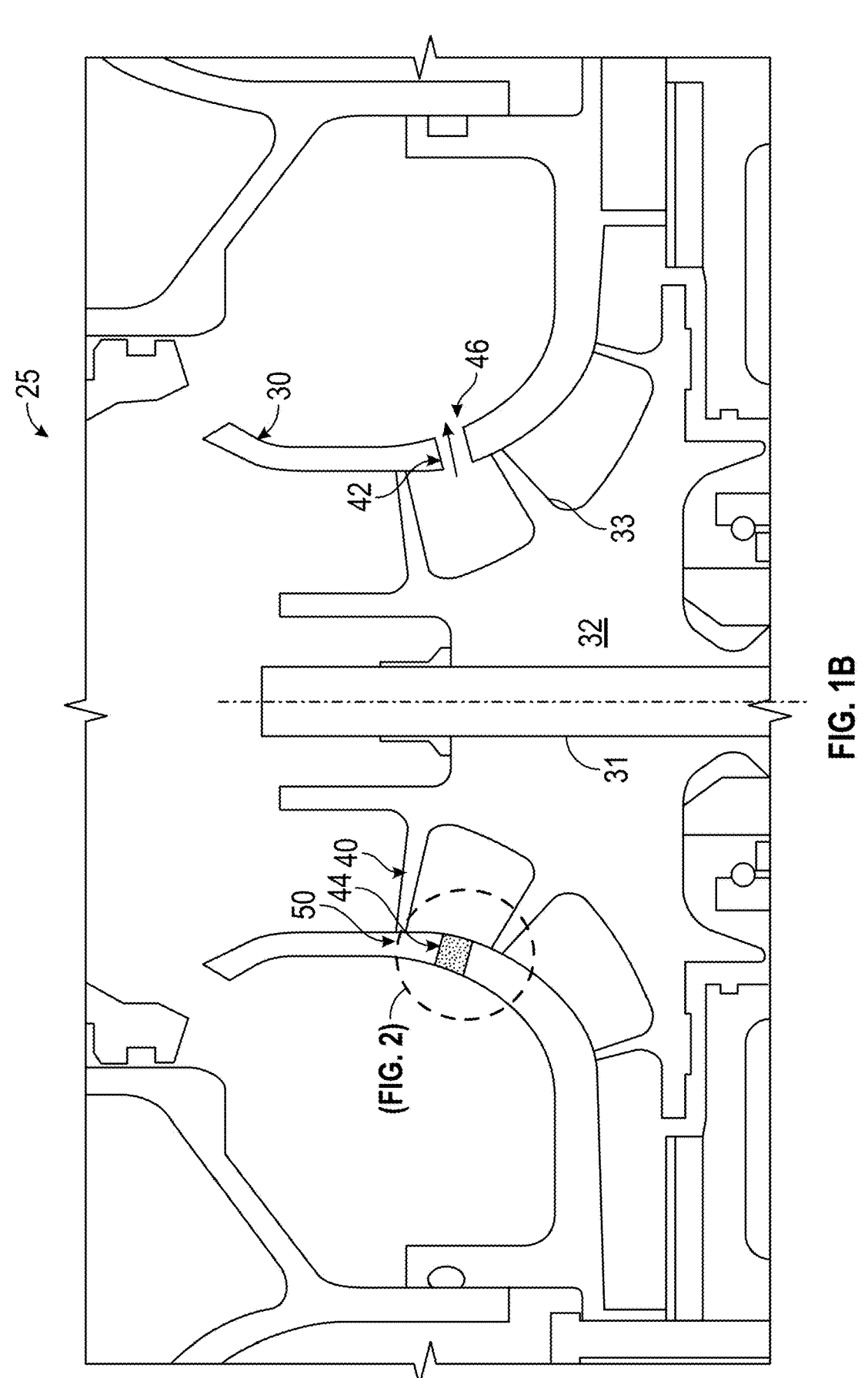
FIG. 1B shows a component of the aircraft according to an embodiment.

FIG. 1A shows an aircraft 1 having a fuselage 2 with a wing 3 and tail assembly 4, which may have control surfaces 5. The wing 3 may include an engine 6, such as a gas turbine engine, and an auxiliary power unit 7 may be disposed at the tail assembly 4. The aircraft 1 may have a cabin air compressor 25. FIG. 1B shows additional details of the cabin air compressor 25, which may include a compressor case 30 (or more generally, a device or component 30) with a rotating shaft 31 and a rotating compressor blade 32 with seals 33. The component 30 may be a compressor case of the cabin air compressor 25. A bypass port 40 may be formed in a section 50 of the component 30 to allow passage of a flow from the compressor 60.

Figures 2, 3:
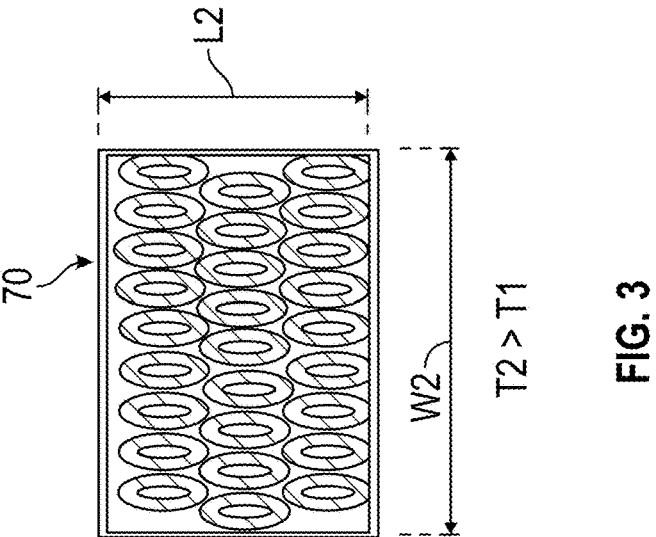
FIG. 2 shows a section of the component in a normal state, with a base that defines voids that are respectively lined with beads that define bead voids, where the beads have a coefficient of thermal expansion (CTE) that is selected to provide a predetermined deformation when subjected to thermal input, and where a thermoelectric junction is formed either within at least one of the bead voids or around the base.
FIG. 3 shows the section of FIG. 2 in a deformed state.

In one embodiment, as shown in FIG. 2, the component 30 may be, e.g., additively manufactured, to define a base 70 formed of a first material. The base 70 may define an outer boundary 80 and internal base voids 95 or cavities. The base voids 95 may be lined with a second material, that differs from the first material, to form individual beads 90. The beads 90 may respectively define bead voids 100 or cavities. The second material may also cover the outer boundary 80 of the base 70 to form a base outer surface 104. A thermoelectric junction 150 may be disposed in one more of the bead voids 100, or may be disposed around the boundary of the base 70.

The beads 90 may be formed of a bistable metal, alloy or composite. The beads 90 have an oval cross section, though other shapes are within the scope of the disclosure. The base voids 95 have a shape that is complementary to the shape of the beads 90. The beads 90 are configured to change shape by a predetermined amount when subject to thermal input (e.g., heat) due to the coefficient of thermal expansion (CTE) of the second material. For example, when the beads 90 are subject to thermal input, shape of the base 70 may change from a first state (FIG. 2) to a second state (FIG. 3). In the first state, the base 70 may extend in a first direction (or length direction) to define a first length L1 and in a second direction (or width direction) to define a first width W1 (FIG. 2). In the second state the base 70 may have extend in the first direction to define a second length L2 and in the second direction to define a second width W2 (FIG. 3). From the shape change, one of the first length and width L1, W1 may be greater than or less than a corresponding one of the second length and width L2, W2. In the illustrated embodiment, the second width W2 is less than the first width W1 and the first and second lengths L1, L2 are the same as each other.

A thermoelectric junction 150 may be disposed in one more of the bead voids 100, or may be disposed around the boundary 80 of the base 70. The thermoelectric junction 150 may be a Peltier device or a Thomson device. For example, alternating P and N-type pillars made with materials with different Seebeck coefficients, or legs, are placed thermally in parallel to each other and electrically in series and joined with a thermally conducting plate on each side, e.g., ceramic, including a cooling plate 152 and a heating plate 154. When a voltage is applied to the free ends of the two semiconductors, via connections 156 there is a flow of DC current across the junction of the semiconductors, causing a temperature difference. The side with the cooling plate 152 absorbs heat which is then transported by the semiconductor to the other side of the device. One of the cooling plate 152 or heating plate 154 may be exposed to the atmosphere if desired to bleed energy from it rather than directing energy from it back to the component 10.

Figures 4, 5:
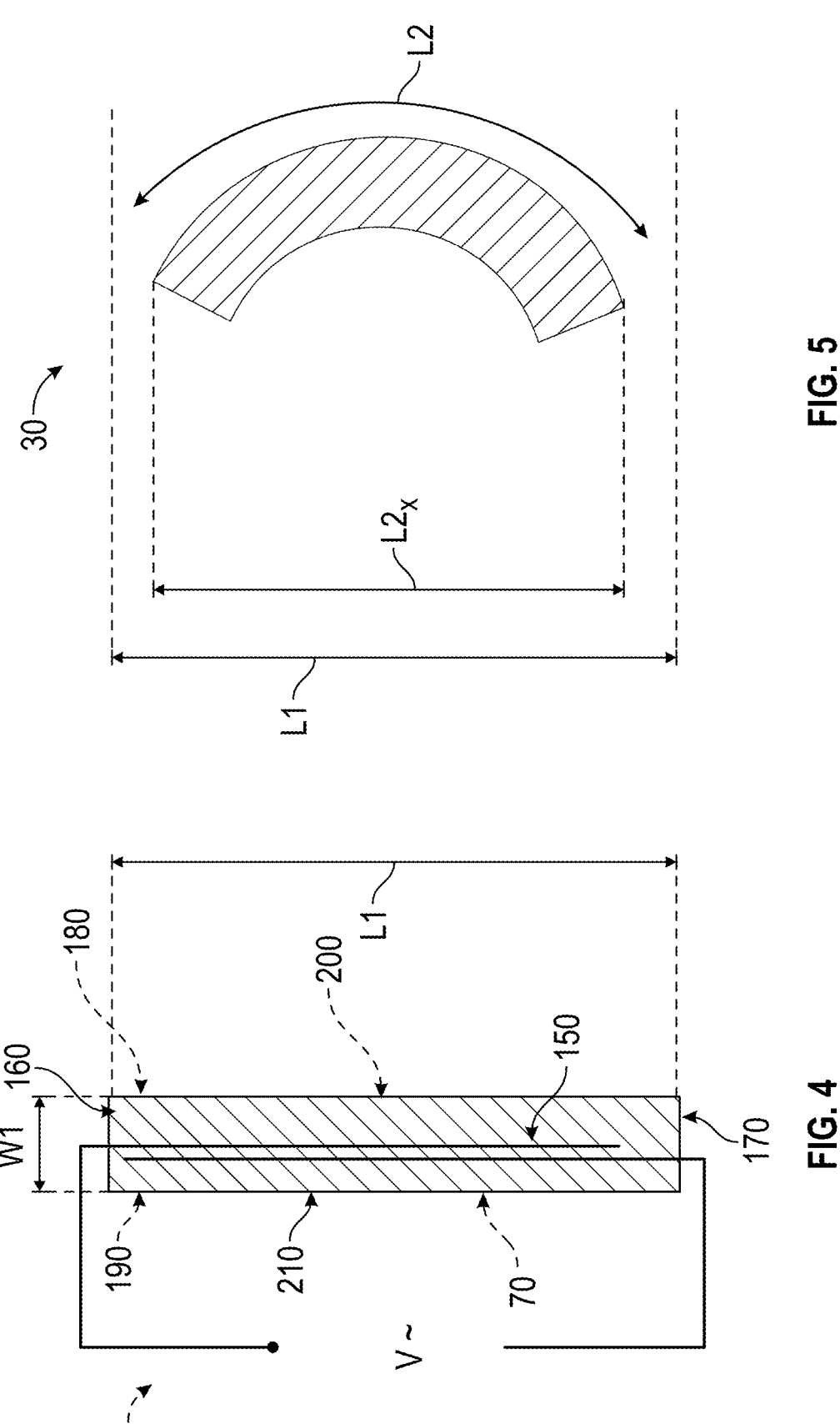
FIG. 4 shows another configuration of the section of the component in the normal state, with a base formed of a material having a CTE that is selected to provide a predetermined deformation when subjected to heating, and where a thermoelectric junction is formed within the base.
FIG. 5 shows the section of FIG. 4 in a deformed state.

In another embodiment, shown in FIG. 4, the component 30 may be, e.g., additively manufactured, with a base 70 formed of a substantially unitary material and a thermoelectric junction 150 formed within the base 70. The base 70 may have a CTE that is selected to provide a predetermined deformation when subjected to thermal input. For example, the base 70 may extend in the first direction (the length direction) between first and second ends 160, 170 and the second direction (the width direction) between first and second side 180, 190. The thermoelectric junction 150 may be disposed between the first and second sides 180, 190 and extend in the first direction between the first and second ends 160, 170. This configuration defines a first layer 200 of the base 70, between the junction 150 and the first side of the base 70, and a second layer 210 of the base 70, and a second layer of the base 70, between the junction 150 and the second side 190 of the base 70.

The base 70 may be formed of a bistable metal, alloy or composite and extends in a first direction to define a first width W1 and in a second direction to define a first length L1. When subjected to differential thermal input by the thermoelectric junction 150, such as heating only one layer 200, 210 of the base 70, the base 70 may deform as shown in FIG. 5 to form an arcuate shape. When in the deformed state, a longer side of the base 70 may have a length L2 that is greater than the first length L1, though projected along first direction the base 70 has a second length L2x that is shorter than the first length L1. The width may be unchanged.

As can be appreciated, utilizing disclosed material configuration shown in FIG. 2 to form the component 30 as the case with the bypass port 40, the bypass port 40 may be selectively opened or closed by applying thermal input to the material. That is, the port 40 may be opened or closed by driving current, through the thermoelectric junction, in a first direction or a second direction. That is, a controllable bypass port 40 may be obtained without the need for a movable part.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A device, comprising:
   a base having an outer boundary and a plurality of base voids, formed from a first material having a first coefficient of thermal expansion (CTE);
   beads that respectively line each one of the base voids, formed from a second material having a second CTE that differs from the first CTE, wherein each of the beads has a bead void; and
   a thermoelectric junction around the outer boundary, or within one or more of the bead voids,
   wherein the device is a compressor case of a cabin air compressor; and
   a section of the device defines a bypass port that is opened or closed by driving current, through the thermoelectric junction, in a first direction or a second direction.

2. The device of claim 1, wherein:
   the thermoelectric junction is a Peltier device.

3. The device of claim 1, wherein:
   one or more of the first material and the second material is a bistable metal, alloy or composite.

4. The device of claim 1, wherein:
   a base outer surface is formed from the second material.

5. A cabin air compressor comprising the device of claim 1.

* * * * *